(12) United States Patent
Hussey

(10) Patent No.: US 12,118,533 B1
(45) Date of Patent: Oct. 15, 2024

(54) BEHAVIOR BASED ALLOCATION OF PAYMENT TOKENS

(71) Applicant: Wells Fargo Bank, N.A., San Francisco, CA (US)

(72) Inventor: Ben L. Hussey, Des Moines, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 618 days.

(21) Appl. No.: 16/722,966

(22) Filed: Dec. 20, 2019

Related U.S. Application Data

(62) Division of application No. 14/866,303, filed on Sep. 25, 2015.

(51) Int. Cl.
| | |
|---|---|
| *G06Q 20/40* | (2012.01) |
| *G06Q 20/24* | (2012.01) |
| *G06Q 20/32* | (2012.01) |
| *G06Q 20/34* | (2012.01) |
| *H04L 9/08* | (2006.01) |
| *H04L 9/32* | (2006.01) |

(52) U.S. Cl.
CPC ....... *G06Q 20/3263* (2020.05); *G06Q 20/322* (2013.01); *G06Q 20/326* (2020.05); *G06Q 20/34* (2013.01); *G06Q 20/4018* (2013.01); *H04L 9/0847* (2013.01); *H04L 9/3228* (2013.01); *G06Q 20/24* (2013.01)

(58) Field of Classification Search
CPC ........... G06Q 20/3263; G06Q 20/4018; G06Q 20/24; G06Q 20/322; G06Q 20/326; G06Q 20/34; H04L 9/3228; H04L 9/0847
USPC .......................................................... 705/67
See application file for complete search history.

(56) References Cited

U.S. PATENT DOCUMENTS

| | | | |
|---|---|---|---|
| 7,014,107 B2 | 3/2006 | Singer et al. | |
| 7,600,676 B1 * | 10/2009 | Rados | G06Q 30/06 235/382 |
| 7,707,119 B2 | 4/2010 | Foster | |

(Continued)

OTHER PUBLICATIONS

Pre-Appeal Brief Request for Review from counterpart U.S. Appl. No. 14/866,303, filed Jun. 7, 2021, 5 pp.

(Continued)

*Primary Examiner* — Mohammad A. Nilforoush
*Assistant Examiner* — Wodajo Getachew
(74) *Attorney, Agent, or Firm* — Shumaker & Sieffert, P. A.

(57) ABSTRACT

The disclosure describes a campaign director (CD) system associated with a financial institution and an associated campaign manager (CM) unit executing on a mobile device used to facilitate behavior based allocation of payment tokens and activation of payment transactions based on the tokens. The CM unit of the mobile device may be programmed by the CD system at the financial institution to generate tokens according to a token generation model that is a function of financial behavior history associated with a credit card account. When a credit card is used to initiate a payment transaction with a merchant, the CM unit of the mobile device may generate a token for the payment transaction and send the token to the CD system at the financial institution. The CD system then determines whether to activate the payment transaction based on the token and merchant data associated with the payment transaction.

19 Claims, 6 Drawing Sheets

(56) References Cited

U.S. PATENT DOCUMENTS

| | | | |
|---|---|---|---|
| 8,522,326 | B2 | 8/2013 | Merchant et al. |
| 8,811,959 | B2 | 8/2014 | Conner et al. |
| 2003/0028481 | A1* | 2/2003 | Flitcroft ................. G06Q 20/34 |
| | | | 705/39 |
| 2009/0143104 | A1 | 6/2009 | Loh et al. |
| 2009/0198614 | A1* | 8/2009 | De Ruiter .............. G06Q 20/42 |
| | | | 705/41 |
| 2011/0314539 | A1 | 12/2011 | Horton |
| 2012/0197797 | A1* | 8/2012 | Grigg ................. G06Q 20/1085 |
| | | | 705/43 |
| 2012/0197807 | A1* | 8/2012 | Schlesser ........... G06Q 20/3829 |
| | | | 705/71 |
| 2012/0228375 | A1 | 9/2012 | Iwaloye |
| 2012/0278239 | A1* | 11/2012 | Nosek .................... G06Q 40/06 |
| | | | 705/44 |
| 2012/0284194 | A1* | 11/2012 | Liu ........................... G07F 7/08 |
| | | | 705/66 |
| 2013/0097079 | A1 | 4/2013 | Bruder |
| 2014/0040139 | A1 | 2/2014 | Brudnicki et al. |
| 2014/0040147 | A1* | 2/2014 | Varadarajan ....... G06Q 20/4016 |
| | | | 713/168 |
| 2014/0215218 | A1 | 7/2014 | Brands |
| 2015/0088674 | A1* | 3/2015 | Flurscheim .......... G06Q 20/326 |
| | | | 705/17 |
| 2016/0012421 | A1* | 1/2016 | Chitilian ............ G06Q 20/4014 |
| | | | 705/67 |
| 2016/0253651 | A1* | 9/2016 | Park ....................... G06Q 20/34 |
| | | | 705/39 |

OTHER PUBLICATIONS

Examiner's Answer from U.S. Appl. No. 14/866,303, dated Mar. 18, 2022, 38 pp.
White et al., "How Computers Work," 7th Edition, first printed Oct. 15, 2003, 23 pp.
Prosecution History from U.S. Appl. No. 14/866,303, dated Jan. 24, 2019 through May 6, 2020, 121 pp.
U.S. Appl. No. 14/866,303, filed Sep. 25, 2015, naming inventors Ben Hussey.
Appeal Brief from U.S. Appl. No. 14/866,303, filed Nov. 29, 2021, 51 pp.
Notice of Panel Decision from Pre-Appeal Brief Review from U.S. Appl. No. 14/866,303, dated Jul. 27, 2021, 2 pp.
Response to Office Action mailed Oct. 9, 2020, from U.S. Appl. No. 14/866,303, filed Mar. 9, 2021, 29 pp.
Final Office Action from U.S. Appl. No. 14/866,303, dated Apr. 7, 2021, 54 pp.
Reply Brief from U.S. Appl. No. 14/866,303, filed May 18, 2022, 18 pp.
Final Office Action from U.S. Appl. No. 14/866,303 dated Mar. 15, 2024, 17 pp.
Response to Decision on Appeal dated Nov. 16, 2023 from U.S. Appl. No. 14/866,303, filed Jan. 16, 2024, 14 pp.
Decision on Appeal from U.S. Appl. No. 14/866,303, dated Nov. 16, 2023, 30 pp.
Response to Office Action dated Mar. 15, 2024 from U.S. Appl. No. 14/866,303, filed Jun. 17, 2024, 12 pp.
Notice of Allowance from U.S. Appl. No. 14/866,303 dated Jul. 22, 2024, 12 pp.

* cited by examiner

BEHAVIOR BASED ALLOCATION OF PAYMENT TOKENS

This application is a division of U.S. application Ser. No. 14/866,303, filed Sep. 25, 2015, the entire content of which is incorporated herein by reference.

TECHNICAL FIELD

The disclosure relates to authorization of payment transactions.

BACKGROUND

Credit cards have long provided card holders with a convenient payment option at a majority of merchants. Credit cards include unique information that links the card holder to an account with a financial institution (e.g., a bank or a non-bank card issuer provider). For example, in the case of a traditional credit card, the account may comprise an amount of credit available to the card holder, or in the case of a debit card, the account may comprise a checking or savings account that belongs to the card holder. Credit cards typically include the card holder's name, the account number, an expiration date, and a card security code (CSC) (alternatively referred to as a card verification value (CVV) or card verification code (CVC)) printed or embossed on the physical card. In addition, credit cards typically include a magnetic stripe or chip that is attached to the physical card and encoded with the unique information.

For "card present" transactions performed by a credit card with a merchant, the unique information may be retrieved when the magnetic stripe is swiped or the chip is inserted or positioned proximate to a point-of-sale device at the merchant. For "card not present" transactions performed by a credit card that take place over the phone or the Internet with a merchant, the unique information may be retrieved when the card holder provides (e.g., reads aloud or manually enters) the unique information to the merchant. In either scenario, the merchant communicates the unique information to the financial institution for authorization of the payment transaction. The unique information included on credit cards is static and continually activated for payment transactions. This makes the use of credit cards simple and convenient for card holders, but also leaves the card holder open to credit card fraud and theft.

SUMMARY

In general, this disclosure describes techniques for secure authorization of payment transactions performed by a credit card based on payment tokens allocated by a mobile device according to a financial behavior history associated with the credit card account. Conventionally, payment transactions performed by a credit card are authorized by a financial institution (e.g., a bank or a non-bank card provider) based only on the static information that identifies the credit card account. In order to provide a more secure payment transaction authorization system and reduce credit card fraud and theft, the disclosed techniques include activating a payment transaction based on a token generated for the payment transaction. The token may include both static information identifying the credit card account used to perform the payment transaction and dynamic information for the specific payment transaction. According to the disclosed techniques, the token is generated based on a financial behavior history associated with the credit card account used to perform the payment transaction.

This disclosure describes a campaign director (CD) system associated with a financial institution and an associated campaign manager (CM) unit executing on a mobile device used to facilitate the behavior based allocation of payment tokens and activation of payment transactions based on the tokens. For example, the CM unit of the mobile device may be programmed by the CD system at the financial institution to generate tokens according to a token generation model that is a function of the financial behavior history associated with a credit card account. When a credit card is used to initiate a payment transaction with a merchant, the CM unit of the mobile device may generate a token for the payment transaction and send the token to the CD system at the financial institution. The CD system then determines whether to activate the payment transaction based on the token and merchant data associated with the payment transaction.

In one example, this disclosure is directed to a method comprising establishing, by a CM unit executing on one or more processors of a mobile device, communication with a CD system associated with a financial institution, the CM unit being linked to a credit card account at the financial institution; generating, by the CM unit of the mobile device, a token for a payment transaction initiated by a credit card of the credit card account with a merchant, wherein the token is generated based on a financial behavior history associated with the credit card account; sending, by the CM unit of the mobile device to the CD system at the financial institution, the token generated for the payment transaction; and receiving, by the CM unit of the mobile device from the CD system at the financial institution, a message indicating whether the payment transaction is activated based on the token and merchant data associated with the payment transaction.

In another example, this disclosure is directed to a mobile device comprising one or more storage units configured to store a CM unit executed on one or more processors of the mobile device, the CM unit being linked to a credit card account at a financial institution, and the one or more processors in communication with the one or more storage units. The one or more processors configured to establish communication with a CD system associated with a financial institution, generate a token for a payment transaction initiated by a credit card of the credit card account with a merchant, wherein the token is generated based on a financial behavior history associated with the credit card account, send the token generated for the payment transaction to the CD system at the financial institution, and receive, from the CD system at the financial institution, a message indicating whether the payment transaction is activated based on the token and merchant data associated with the payment transaction.

In a further example, this disclosure is directed to a non-transitory computer readable medium storing instructions that, when executed, cause one or more processors of a mobile device to establish, by a CM unit executing on the one or more processors of the mobile device, communication with a CD system associated with a financial institution, the CM unit being linked to a credit card account at the financial institution; generate, by the CM unit of the mobile device, a token for a payment transaction initiated by a credit card of the credit card account with a merchant, wherein the token is generated based on a financial behavior history associated with the credit card account; send, by the CM unit of the mobile device to the CD system at the financial institution, the token generated for the payment transaction; and receive, by the CM unit of the mobile device from the CD system at the financial institution, a message indicating whether the payment transaction is activated based on the token and merchant data associated with the payment transaction.

In an additional example, this disclosure is directed to a CD system associated with a financial institution, the system comprising a token subscription unit configured to program a CM unit executed on one or more processors of a mobile device to generate tokens for payment transactions based on a financial behavior history associated with a credit card account at the financial institution, and a transaction activation unit. The transaction activation unit configured to receive, from the CM unit of the mobile device, a token generated for a payment transaction initiated by a credit card of the credit card account with a merchant, receive, from the merchant, merchant data associated with the payment transaction, determine whether to activate the payment transaction based on a comparison of the token generated for the payment transaction and the merchant data associated with the payment transaction, and send, to at least one of the CM unit of the mobile device or the merchant, a message indicating whether the payment transaction is activated.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
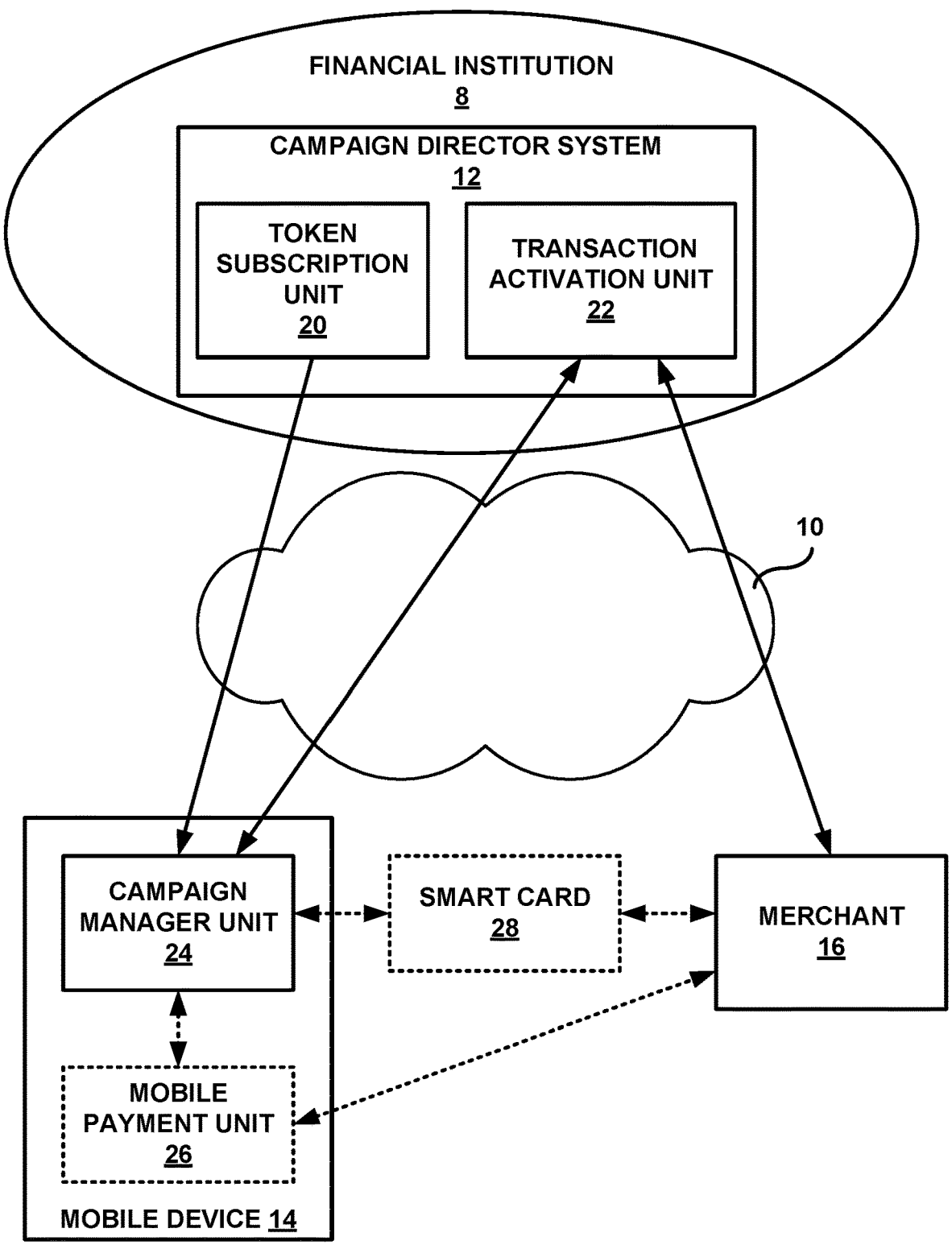
FIG. 1 is a block diagram illustrating an example payment transaction system configured to activate credit card payment transactions based on tokens generated according to financial behavior history associated with a credit card account, in accordance with the techniques of this disclosure.

FIG. 1 is a block diagram illustrating an example payment transaction system configured to activate credit card payment transactions based on tokens generated according to financial behavior history associated with a credit card account, in accordance with the techniques of this disclosure. Conventionally, payment transactions performed by a credit card with a merchant are authorized by a financial institution based only on static information that identifies the credit card account at the financial institution. In order to provide a more secure payment transaction authorization system and reduce credit card fraud and theft, this disclosure describes a payment transaction system, illustrated in FIG. 1, that activates a payment transaction performed by a credit card with a merchant based on a token that includes both the static information identifying the credit card account and dynamic information for the specific payment transaction.

The payment transaction system illustrated in FIG. 1 includes a campaign director (CD) system 12 associated with a financial institution 8 and a campaign manager (CM) unit executed on a mobile device 14 that work together in a "campaign" to activate credit card payment transactions performed with a merchant 16. CM unit 24 of mobile device 14 may be associated or linked with one or more credit card accounts at financial institution 8 that belong to a user of mobile device 14. In some cases, the one or more of the credit card accounts may be accessible via virtual credit cards stored in a mobile payment unit 26 of mobile device 14. In other cases, at least one of the credit card accounts may be accessible via a physical smart card 28. Any of smart card 28 or the virtual credit cards stored in mobile payment unit 26 may be used to perform a payment transaction with merchant 16.

According to the techniques of this disclosure, when smart card 28 or one of the virtual credit cards stored in mobile payment unit 26 is used to initiate a payment transaction with merchant 16, CM unit 24 generates a token that identifies the associated credit card account and also identifies the specific payment transaction. Upon receiving the token from CM unit 24, CD system 12 determines whether to activate the payment transaction based on the token received from CM unit 24 and merchant data received from merchant 16.

In some cases, financial institution 8 may be a traditional bank or credit union with the capability to issue credit cards. In other cases, financial institution 8 may be a non-bank card provider. For ease of explanation, this disclosure uses the term "credit card" to refer to both a traditional credit card and a debit card. For example, in the case of a traditional credit card, the associated account at financial institution 8 may comprise an amount of credit available to the card holder, which may be based on the card holder's credit score, income, and other financial behavior indicators. In the case of a debit card, the associated account at financial institution 8 may comprise a demand deposit account that holds funds belonging to the card holder, e.g., a checking or savings account.

CD system 12 at financial institution 8 may comprise a centralized or distributed system of one or more computing devices, such as such as desktop computers, laptops, workstations, wireless devices, network-ready appliances, file servers, print servers, or other devices. The computing devices of CD system 12 may be configured to execute token subscription unit 20 and transaction activation unit 22. Token subscription unit 20 may be configured to distribute, program, and update CM unit 24 of mobile device 14. For example, token subscription unit 20 may program and periodically update CM unit 24 based on financial behavior history associated with the one or more credit card accounts at financial institution 8 that belong to the user of mobile device 14. Transaction activation unit 22 may be configured to determine whether to activate a given payment transaction based on information for the payment transaction received from CM unit 24 and merchant 16. CD system 12 is described in more detail below with respect to FIG. 3.

The payment transaction system illustrated in FIG. 1 shows CD system 12 at financial institution 8 in communication with only a single mobile device 14 having CM unit 24. In other examples, the payment transaction system may include multiple different mobile devices having CM units that are in communication with CD system 12. In those examples, the CM units at the different mobile devices may be associated or linked to credit card accounts at financial institution 8 that belong to the users of the respective mobile devices. In further examples, the payment transaction system may include multiple different financial institutions having CD systems in communication with other CM units of mobile device 14. In those examples, the other CM units of mobile device 14 may be associated or linked to one or more credit card accounts at the other financial institutions.

Mobile device 14 may comprise any of a wide range of portable devices, including wireless communication devices or wireless handsets, such as so-called "smart" phones, "smart" pads, and "smart" watches, notebook (i.e., laptop) computers, tablet computers, cameras, digital media players, key fobs, or other personal digital appliances equipped for wireless communication. Mobile device 14 may include at least one user input (UI) device (not shown) that enables the user of mobile device 14 to interact with mobile device 14. In some examples, the UI device of mobile device 14 may be configured to receive tactile, audio, or visual input. In addition to receiving input from a user, the UI device of mobile device 14 may be configured to output content such as a graphical user interface (GUI) for display, e.g., at a display device associated with mobile device 14.

Mobile device 14 may include one or more processors configured to execute CM unit 24. For example, CM unit 24 may be implemented as a downloadable or pre-installed application or "app" that is executed by the one or more processors of mobile device 14. CM unit 24 may be programmed and periodically updated by token subscription unit 20 of CD system 12 based on financial behavior history associated with the one or more credit card accounts at financial institution 8 that belong to the user of mobile device 14. In other examples, CM unit 24 may be implemented as part of a hardware unit of mobile device 14.

As one example, CM unit 24 may be programmed with a token generation engine for a given credit card account that is selected based on the financial behavior history associated with that credit card account. In addition, CM unit 24 may be programmed to allocate up to a predetermined number of tokens for the given credit card account within a certain time frame, e.g., per day, per week, or per month, based on the financial behavior history associated with that credit card account. The financial behavior history associated with a credit card account may include a card holder's credit score, credit limit, debt-to-credit ratio, annual income, payment history including late or past-due payments, credit limit or account overdraft history, historical card usage on daily, weekly, monthly and/or yearly basis, and the like.

In this example, CM unit 24 may be programmed to have a different token generation engine and different token count for each of the one or more associated or linked credit card accounts at financial institution 8. In some examples, mobile device 14 may include mobile payment unit 26 that stores one or more virtual credit cards. In other examples, mobile device 14 may not have a mobile payment unit and, instead, only be associated with credit card accounts that are linked to physical smart cards, e.g., smart card 28. Mobile device 14 and CM unit 24 are described in more detail below with respect to FIG. 2.

As illustrated in FIG. 1, CD system 12 may communicate with CM unit 24 of mobile device 14 and merchant 16 via a network 10. Network 10 may comprise a private network associated with financial institution 8 or may comprise a public network, such as the Internet. Although illustrated as a single entity, network 10 may comprise a combination of networks. In some examples, network 10 may comprise one or more of a wide area network (WAN) (e.g., the Internet), a wireless local area network (WLAN) (e.g., a Wi-Fi network), a wireless personal area network (WPAN) (e.g., a Bluetooth® network), or another wireless communication network.

Mobile device 14 and merchant 16 may communicate in different ways depending on the type of credit card used to initiate the payment transaction and whether the payment transaction is a "card present" transaction or a "card not present" transaction. For a payment transaction initiated by physical smart card 28, mobile device 14 may communicate with smart card 28 via Wi-Fi or Bluetooth and not directly communicate with merchant 16. Smart card 28 may communicate with merchant 16 via a point-of-sale device at merchant 16 or via a communication network, such as the Internet. In a "card present" transaction, the point-of-sale device at merchant 16 may be a card reader configured to retrieve information from smart card 28 using a magnetic tape sensor, a radio frequency (RF) sensor, another type of near field communication (NFC) device, or Wi-Fi or Bluetooth.

For payment transactions initiated by a virtual credit card stored in mobile payment unit 26, mobile device 14 may communicate directly with merchant 16. Mobile device 14 may communicate with merchant 16 via a point-of-sale device at merchant 16 or via a communication network, such as the Internet. In a "card present" transaction, the point-of-sale device at merchant 16 may be configured to retrieve information from the virtual credit card stored in mobile payment unit 26 using a RF sensor, another type of NFC device, or Wi-Fi or Bluetooth.

In conventional payment transaction systems, when a payment transaction is initiated by a credit card with a merchant (either as a "card present" or "card not present transaction"), the merchant sends an authorization request to a financial institution that issued the credit card. The authorization request may only include static information identifying the credit card account at the financial institution and a monetary amount of the payment transaction. In response, the financial institution may verify that the identified credit card account is valid and verify that sufficient funds are available in the credit card account in order to authorize the payment transaction at the merchant.

In this case, the credit card is continually activated for payment transactions, and the financial institution authorizes the payment transaction based only on the static information that identifies the credit card account. For example, the static information may include the card holder's name, the credit card account number, an expiration date, and a card security code (CSC) (alternatively referred to as a card verification value (CVV) or card verification code (CVC)) printed or embossed on the physical credit card. In the conventional payment transaction systems, a third party may perform fraudulent credit card purchases simply by stealing the physical credit card or obtaining the static information identity the credit card account (e.g., by copying the information from the physical credit card, retrieving the information from a low security database or website, or requesting the information via a phishing scheme).

These issues with the conventional payment transaction systems are rooted in the existing credit card technology, the point-of-sale technology available at merchants, and the transaction authentication technology at financial institutions. Namely, these technologies were built around the concept of authorizing payment transactions based only on the static information identifying the credit card account used to perform the payment transactions.

In this disclosure, a payment transaction system is described that activates a payment transaction initiated by a credit card based on a token generated for the payment transaction that includes both a static identifier for the credit card account at a financial institution and a random identifier for the payment transaction. According to the disclosed techniques, the token is generated by a campaign manager unit of a mobile device that is associated with or linked to the credit card account at the financial institution based on a financial behavior history associated with the credit card account. The disclosed techniques provide a more secure payment transaction system and may reduce credit card fraud by requiring both the token from the mobile device and merchant data from a merchant to activate the payment transaction.

For example, when a credit card, e.g., smart card 28 or a virtual credit card stored in mobile payment unit 26 of mobile device 14, is used to initiate a payment transaction with merchant 16, CM unit 24 may receive a static identifier for the credit card account from the credit card. CM unit 24 may also receive preemptive information for the payment transaction, such as a handshake timestamp for the interaction between the credit card and merchant 16. Upon receiving the static identifier and preemptive information, CM unit 24 may issue a random identifier for the payment transaction. CM unit 24 may then combine the static identifier, the random identifier, and the preemptive information to generate the token for the payment transaction. For example, CM unit 24 may include both identifiers and the preemptive information in a single packet or communication. After generating the token for the payment transaction, CM unit 24 then sends the token generated for the payment transaction to transaction activation unit 22 of CD system 12 at financial institution 8.

Continuing the above example, transaction activation unit 22 of CD system 12 may allocate a time slot interval for the payment transaction, and expect to receive the token for the payment transaction from CM unit 24 within that time slot interval. Upon receiving the token from CM unit 24, transaction activation unit 22 of CD system 12 may store the token in the time slot interval for the payment transaction and start a watchdog timer. Transaction activation unit 22 of CD system 12 expects to receive merchant data associated with the payment transaction from merchant 16 prior to expiration of the watchdog timer. The merchant data may also include the static identifier for the credit card account.

Transaction activation unit 22 of CD system 12 may then determine whether to activate the payment transaction based on the token received from CM unit 24 and the merchant data received from merchant 16. If either the token or the merchant data is not received in the expected time window, transaction activation unit 22 of CD system 12 may immediately denying the payment transaction. If the both the token and the merchant data are received as expected, transaction activation unit 22 compares the preemptive information of the token with actual payment transaction information included in the merchant data to determine whether to activate the payment transaction. Transaction activation 22 of CD system then sends a message to CM unit 24 of mobile device 14 and to merchant 16 indicating whether the payment transaction is activated.

In general, the techniques of this disclosure describe appending a dynamically changing random identifier allocated by mobile device 14 with a static identifier from a credit card, and together the information would be used to activate a payment transaction initiated by the credit card at a specific point-in-time. In this case, in order to perform fraudulent credit card purchases, a third party would need to know the random identifier for the payment transaction and the time slot interval for the payment transaction along with the static information identity the credit card account.

If the third party manages to have the static identifier for the credit card account, the third party cannot reproduce the random identifier or the point-in-time for the payment transaction that is necessary to perform fraudulent credit card purchases unless the third party also has access to CM unit 24 of mobile device 14. Conversely, if the third party has access to CM unit 24 of mobile device 14, the third party still may not perform fraudulent credit card purchases unless the third party also has access to the credit card account. In addition, algorithms used by CM unit 24 to allocate the random identifier during the time slot interval may be periodically updated, which may further frustrate a third party attempting to perform fraudulent credit card purchases.

Figure 2:
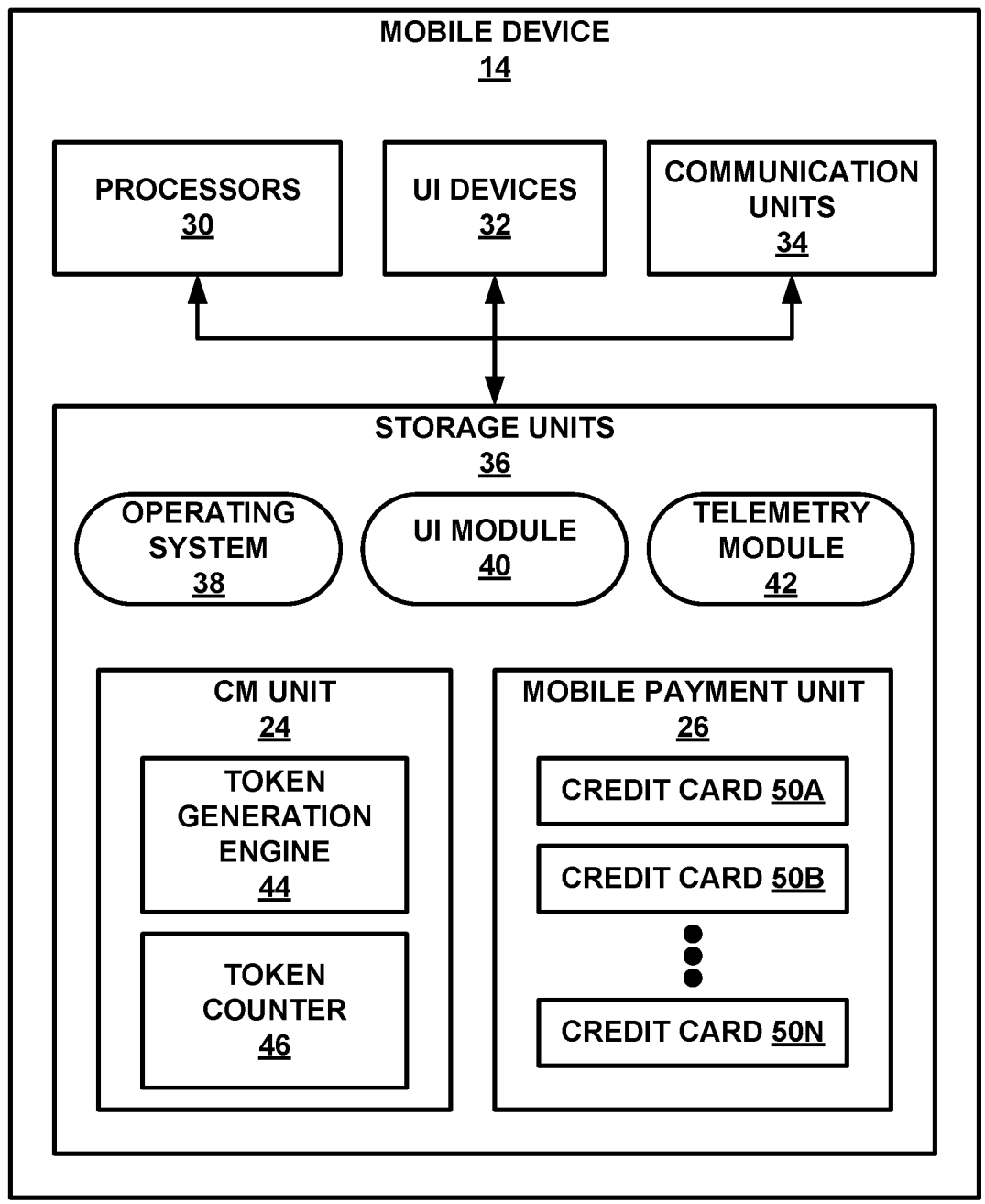
FIG. 2 is a block diagram illustrating an example mobile device including a campaign manager unit configured to generate tokens for payment transactions, in accordance with the techniques of this disclosure.

FIG. 2 is a block diagram illustrating an example of mobile device 14 from FIG. 1 in greater detail, including CM unit 24 configured to generate tokens for payment transactions, in accordance with the techniques of this disclosure. The architecture of mobile device 14 illustrated in FIG. 2 is shown for exemplary purposes only and mobile device 14 should not be limited to this architecture. In other examples, mobile device 14 may be configured in a variety of ways.

As shown in the example of FIG. 2, mobile device 14 includes one or more processors 30, one or more user interface (UI) devices 32, one or more communication units 34, and one or more storage units 36. Storage units 36 of mobile device 14 include operating system 38, UI module 40, telemetry module 42, CM unit 24, and mobile payment unit 26, which are executable by processors 30. Each of the components, units or modules of mobile device 14 are coupled (physically, communicatively, and/or operatively) using communication channels for inter-component communications. In some examples, the communication channels may include a system bus, a network connection, an inter-process communication data structure, or any other method for communicating data.

Processors 30, in one example, may comprise one or more processors that are configured to implement functionality and/or process instructions for execution within mobile device 14. For example, processors 30 may be capable of processing instructions stored by storage units 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Storage units 36 may be configured to store information within mobile device 14 during operation. Storage units 36 may include a computer-readable storage medium or computer-readable storage device. In some examples, storage units 36 include one or more of a short-term memory or a long-term memory. Storage units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 36 are used to store program instructions for execution by processors 30. Storage units 36 may be used by software or applications running on mobile device 14 (e.g., CM unit 24 or mobile payment unit 26) to temporarily store information during program execution.

Mobile device 14 may utilize communication units 34 to communicate with external devices via one or more networks, e.g., network 10 from FIG. 1. Communication units 34 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, mobile device 14 utilizes communication units 34 to wirelessly communicate with an external device such as CD system 12 at financial institution 8, smart card 28, or merchant 16. Communication units 34 may be controlled by telemetry module 42.

UI devices 32 may be configured to operate as both input devices and output devices. For example, UI devices 32 may be configured to receive tactile, audio, or visual input from a user of mobile device 14. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of mobile device 14. For example, operating system 38, in one example, facilitates the communication of UI module 40, telemetry module 42, CM unit 24, and mobile payment unit 26 with processors 30, UI devices 32, communication units 34, and storage units 36. UI module 40, telemetry module 42, CM unit 24, and mobile payment unit 26 may each include program instructions and/or data stored in storage units 36 that are executable by processors 30. As one example, CM unit 24 may include instructions that cause mobile device 14 to perform one or more of the techniques described in this disclosure.

Mobile device 14 may include additional components that, for clarity, are not shown in FIG. 2. For example, mobile device 14 may include a battery to provide power to the components of mobile device 14. Similarly, the components of mobile device 14 shown in FIG. 2 may not be necessary in every example of mobile device 14.

According to the techniques of this disclosure, CM unit 24 of mobile device 14 may be configured to generate a token for a payment transaction initiated by a credit card of a credit card account linked to CM unit 24 based on a financial behavior history associated with the credit card account. The linked credit card account may be accessible via a credit card. In one example, the credit card may comprise a physical smart card, such as smart card 28 from FIG. 1. In another example, the credit card may comprise one of virtual credit cards 50A-50N (hereinafter "credit cards 50") stored in mobile payment unit 26 of mobile device 14.

CM unit 24 may comprise software that is downloaded to mobile device 14 and stored in storage units 36 by a campaign director system, e.g., CD system 12 at financial institution 8 from FIG. 1. In some examples, an enrollment protocol may be used to authenticate or bind CM unit 24 to CD system 12 at financial institution 8 for participation in a campaign to activate credit card payment transactions. The authentication or binding may include CD system 12 sharing a secret, e.g., a password or other encryption key, with CM unit 24. In some examples, the authentication or binding may occur in response to sensor input received via UI devices 32 or communication units 34 that mobile device 14 is near a point-of-sale device at a merchant, e.g., merchant 16 from FIG. 1. In other examples, the authentication or binding may occur in response to the user of mobile device 14 opening or selecting to use CM unit 24 via UI devices 32.

CM unit 24 includes a token generation engine 44 and a token counter 46 associated with the linked credit card account. In some examples, CM unit 24 may include a different token generation engine and token counter for each different credit card account linked to CM unit 24. Token generation engine 44 may be configured to generate a secure digital token for a payment transaction using a random number sequencing model that is programmed and controlled by CD system 12 at financial institution 8. Token generation engine 44 may be periodically updated by CD system 12 in order to change the model, algorithm, and or encryption scheme used by token generation engine 44 so as not to produce stale data. In some examples, token generation engine may be in an inactive state until activated by sensory input received via UI devices 32 or by input from an external key-fob or smart card received via communication units 34. Once the token is generated for the payment transaction, token generation engine 44 may return to the inactive state.

In accordance with the techniques of this disclosure, token generation engine 44 and token counter 46 of CM unit 24 may be programmed or updated by CD system 12 to have particular features or values based on the financial behavior history associated with the credit card account linked to CM unit 24. The financial behavior history associated with a credit card account may include a card holder's credit score, credit limit, debt-to-credit ratio, annual income, payment history including late or past-due payments, credit limit or account overdraft history, historical card usage on daily, weekly, monthly and/or yearly basis, and the like.

As one example, token generation engine 44 for the linked credit card account may be programmed to use a high-complexity algorithm or a high level of encryption to generate tokens for payment transactions based on a history of high risk behavior by the credit card account holder. Conversely, token generation engine 44 for the linked credit card account may be programmed to use a low-complexity algorithm or a low level of encryption to generate tokens for payment transactions based on a history of low risk behavior by the credit card account holder.

As another example, token counter 46 for the linked credit card account may be programmed with a larger number of tokens that may be allocated within a certain time frame, e.g., per day, per week, or per month, based on a history of good financial behavior, e.g., paying on-time, not exceeding the credit limit, and having a high credit score. Conversely, token counter 46 for the linked credit card account may be programmed with a smaller number of tokens that may be allocated within a certain time frame, e.g., per day, per week, or per month, based on a history of poor financial behavior, e.g., late payments, exceeding the credit limit, and having a low credit score.

Upon activating CM unit 24 and token generation engine 44, token generation engine 44 may immediately begin to generate a token, but CM unit 24 must wait for the credit card of the linked credit card account to broadcast its identity. Once the credit card of the linked credit card account is used to initiate a payment transaction, CM unit 24 may receive a static identifier for the credit card account and preemptive information for the payment transaction from the credit card. The static identifier for the credit card account may include the card holder's name, the account number, the expiration date, and the card security code that is printed or embossed on the physical card. The preemptive information for the payment transaction may include one or more of a handshake timestamp between the credit card and the merchant, a monetary amount, a geographic location of the merchant, or a name of the merchant.

In one example, CM unit 24 receives the static identifier and preemptive information from a smart card, e.g., smart card 28, via communication units 34 when smart card 28 is swiped or positioned near a point-of-sale-device at the merchant, or when the user provides the account information associated with smart card 28 to the merchant via the phone or the Internet. In another example, CM unit 24 receives the static identifier and preemptive information from one of credit cards 50 stored in mobile payment unit 26 of mobile device 14 when a user selects the one of credit cards 50 via UI devices 32 and mobile device 14 communicates with a point-of-sale-device at the merchant via communication units 34, or when the user provides the account information associated with the selected one of credit cards 50 to the merchant via the phone or the Internet.

Upon receiving the static identifier and preemptive information, token generation engine 44 may use the random number sequencing model to issue a random identifier for the payment transaction. Token generation engine 44 may then combine the static identifier, the random identifier, and the preemptive information to generate the token for the payment transaction. CM unit 24 then sends the token generated for the payment transaction to CD system 12 at financial institution 8. After generating the token for the payment transaction, token counter 46 decrements the predetermined number of tokens that may be allocated within the certain time frame by one. CM unit 24 then starts a deactivation sleep cycle in which token generation engine 44 is deactivated and put to sleep, and finally CM unit 24 goes to sleep until activated for a subsequent payment transaction.

Figure 3:
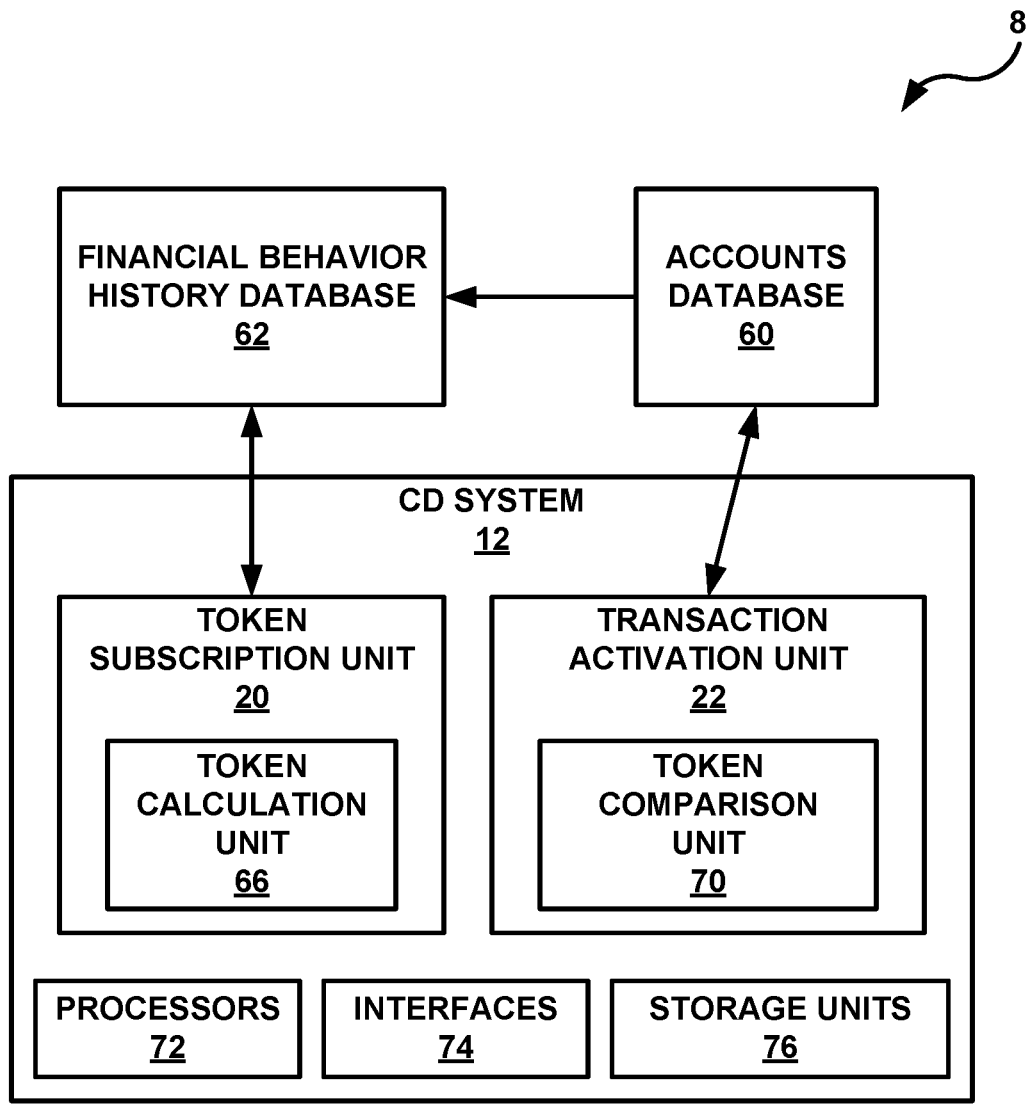
FIG. 3 is a block diagram illustrating an example campaign director system at a financial institution configured to activate payment transactions based on tokens, in accordance with the techniques of this disclosure.

FIG. 3 is a block diagram illustrating an example of CD system 12 at financial institution 8 from FIG. 1 in greater detail, CD system 12 configured to activate payment transactions based on tokens, in accordance with the techniques of this disclosure. The architecture of CD system 12 illustrated in FIG. 3 is shown for exemplary purposes only and CD system 12 should not be limited to this architecture. In other examples, CD system 12 may be configured in a variety of ways.

CD system 12 at financial institution 8 may comprise a centralized or distributed system of one or more computing devices, such as such as desktop computers, laptops, workstations, wireless devices, network-ready appliances, file servers, print servers, or other devices. As shown in the example of FIG. 3, CD system 12 includes one or more processors 72, one or more interfaces 74, and one or more storage units 76. CD system 12 also includes token subscription unit 20 and transaction activation unit 22, which may be executable by processors 72 or implemented as one or more hardware units or devices of CD system 12. Although not shown in FIG. 3, each of the components, units or modules of CD system 12 are coupled (physically, communicatively, and/or operatively) using communication channels for inter-component communications. In some examples, the communication channels may include a system bus, a network connection, an inter-process communication data structure, or any other method for communicating data.

Processors 72, in one example, are configured to implement functionality and/or process instructions for execution within CD system 12. For example, processors 72 may be capable of processing instructions stored by storage units 76. Processors 72 may include, for example, microprocessors, digital signal processors (DSPs), application specific integrated circuits (ASICs), field-programmable gate array (FPGAs), or equivalent discrete or integrated logic circuitry, or a combination thereof.

Storage units 76 may be configured to store information within CD system 12 during operation. Storage units 76 may include a computer-readable storage medium or computer-readable storage device. In some examples, storage units 76 include one or more of a short-term memory or a long-term memory. Storage units 76 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage units 76 are used to store program instructions for execution by processors 72. Storage units 76 may be used by software or applications running on processors 72 of CD system 12 (e.g., token subscription unit 20 and transaction activation unit 22) to temporarily store information during program execution.

CD system 12 may utilize interfaces 74 to communicate with external devices via one or more networks, e.g., network 10 from FIG. 1. Interfaces 74 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, CD system 12 utilizes interfaces 74 to wirelessly communicate with an external device such as CM unit 24 of mobile device 12 or merchant 16.

According to the techniques of this disclosure, CD system 12 at financial institution 8 may be configured to activate a payment transaction initiated by a credit card of a credit card account included in an accounts database 60 at financial institution 8 based on a token received from a mobile device and merchant data received from a merchant. In accordance with the disclosed techniques, token subscription unit 20 is configured to distribute, program, and periodically (e.g., weekly or monthly) update a CM unit of the mobile device, e.g., CM unit 24 of mobile device 14, via interfaces 74 based on a financial behavior history associated with the credit card account linked to the CM unit. Token subscription unit 20 may access the financial behavior history associated with the linked credit card account from financial behavior history database 62 stored at financial institution 8.

As one example, token subscription unit 20 of CD system 12 may program or update a token generation engine of the CM unit to use a particular algorithm to generate tokens for payment transactions and/or to apply a particular level of encryption to the generated tokens based on the financial behavior history associated with the linked credit card account. As another example, token calculation unit 66 of token subscription unit 20 may calculate a number of tokens that may be allocated within a certain time frame, e.g., per day, per week, or per month, based on the financial behavior history associated with the linked credit card account, and token subscription unit 20 may program or update a token counter of the CM unit with the predetermined number of tokens.

In order to activate a payment transaction, transaction activation unit 22 of CD system 12 may allocate a time slot interval for the payment transaction. The time slot interval may be considered a card activity period granted by CD system 12 for the payment transaction. In some examples, the time slot interval may include a variance. For example, the time slot interval may be allocated as a value in milliseconds, e.g., 200 ms or 500 ms, with a variance of 10 percent. Upon receiving a token for the payment transaction from the CM unit via interfaces 74, transaction activation unit 22 may store the token in the time slot interval for the payment transaction and start a watchdog timer in which to complete the transaction activation cycle.

The token generated for the payment transaction may include a static identifier for the given credit card account, a random identifier for the payment transaction, and preemptive information for the payment transaction. The random identifier for the payment transaction may comprise a random number issued by CM unit 24. The static identifier for the credit card account may include the card holder's name, the account number, the expiration date, and the card security code that is printed or embossed on the physical card. The preemptive information for the payment transaction may include one or more of a handshake timestamp between the credit card and the merchant, a monetary amount, a geographic location of the merchant, or a name of the merchant.

Prior to expiration of the watchdog timer, transaction activation unit 22 of CD system 12 may also receive merchant data associated with the payment transaction from the merchant. In some examples, the merchant data may include actual payment transaction information, such as one or more of a handshake timestamp between the credit card and the merchant, a monetary amount, a geographic location of the merchant, or a name of the merchant. The merchant data may also include the static identifier for the credit card account.

If the received token is valid and the token and merchant data are received by transaction activation unit 22 of CD system 12 within the time slot interval and prior to expiration of the watchdog timer, token comparison unit 70 of transaction activation unit 22 compares the preemptive information of the token with the actual payment transaction information included in the merchant data to determine whether to activate the payment transaction. Transaction activation 22 of CD system then sends a message to the CM unit and to the merchant 16 indicating whether the payment transaction is activated.

As one example, token comparison unit 70 may compare the monetary amount, merchant location and/or merchant name included in the preemptive information of the token and the actual payment transaction information of the merchant data to determine whether the information matches and thus identifies the same payment transaction. As another example, token comparison unit 70 may compare the handshake timestamp included in the actual payment transaction information of the merchant data with the handshake timestamp included in the preemptive information of the token to determine whether the handshake timestamps match and fall within the time slot interval including the variance.

If the token in invalid, either the token or the merchant data is not received in the expected time window, or if the token and the merchant data do not match, transaction activation unit 22 of CD system 12 may immediately deny the payment transaction. In this case, transaction activation unit 22 of CD system 12 may determine whether a total number of denied payment transactions exceeds a risk threshold value associated with the credit card account. In the case that the risk threshold value is exceeded, transaction activation unit 22 of CD system 12 may deactivate at least one of the CM unit at the mobile device, the credit card of the given credit card account, or CD system 12 itself until a representative of financial institution 8 can investigate and mitigate the risk. When CD system 12 is reactivated, a new campaign will be started and a new CM unit will be programmed at the mobile device.

Figure 4:
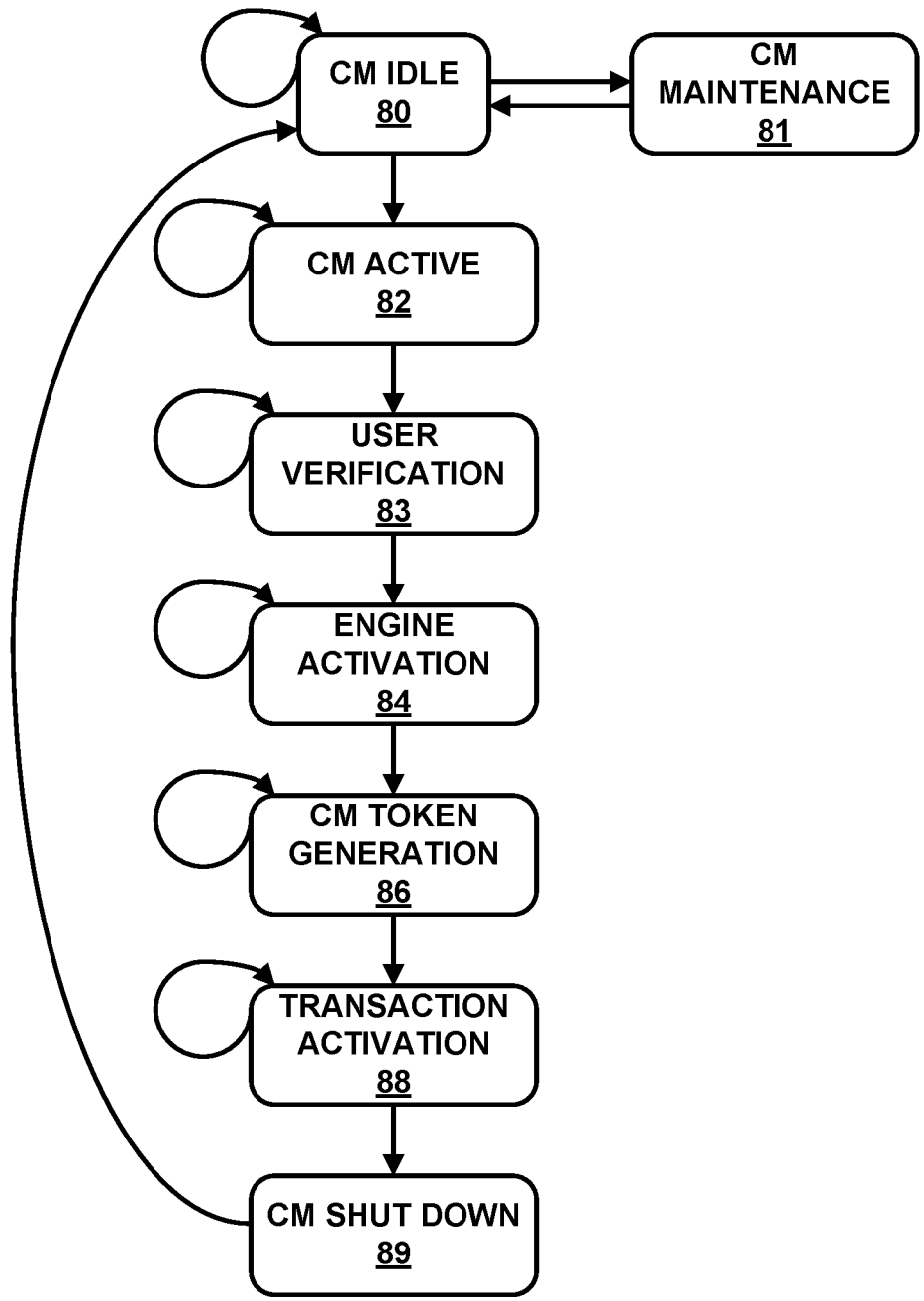
FIG. 4 is a state diagram illustrating example operational states of a campaign manager unit during a payment transaction activation cycle, in accordance with the techniques of this disclosure.

FIG. 4 is a state diagram illustrating example operational states of a campaign manager unit during a payment transaction activation cycle, in accordance with the techniques of this disclosure. The state diagram of FIG. 4 is described with respect to CM unit 24 of mobile device 14 from FIGS. 1 and 2 and CD system 12 at financial institution 8 from FIGS. 1 and 3. The state diagram of FIG. 4 is one example of operational states of CM unit 24. In other examples, CM unit 24 may include more, fewer, or different operational states than those illustrated in FIG. 4.

CM unit 24 of mobile device 14 begins in an idle state 80 (CM IDLE) at which CM unit 24 is not performing any activity. From idle state 80, CM unit 24 may enter a maintenance state 81 based on a maintenance schedule determined by CD system 12 at financial institution 8. In some cases, CD system 12 may request to perform maintenance on CM unit 24 when CM unit 24 is in idle state 80 according to the maintenance schedule. For example, CD system 12 may periodically (e.g., once per week or once per month) request to perform maintenance on CM unit 24 at mobile device 14 to update the model used by token generation engine 44 or to update the predetermined number of tokens tracked by token counter 46 of CM unit 24. As discussed above, the updates may be based on a financial behavior history associated with a credit card account linked to CM unit 24, changes to a risk threshold value associated with the credit card account, or changes to the model used by token generation engine 44 for the credit card account. Once the maintenance on CM unit 24 is completed, CM unit 24 may return to idle state 80.

From idle state 80, CM unit 24 may also enter an active state 82 based on some activity performed by the user of mobile device 14 or some activity sensed by mobile device 14. In one example, CM unit 24 may enter active state 82 based on the user opening or selecting to use CM unit 24 on mobile device 14. In other examples, CM unit 24 may enter active state 82 based on the user accessing or logging into mobile payment unit 26 of mobile device 14, or based on mobile device 14 or smart card 28 sensing a nearby point-of-sale device at merchant 16. In active state 82, CM unit 24 may determine whether certain processes (e.g., activating a payment transaction or performing a maintenance update) are currently being performed by CM unit 24. CM unit 24 may need to wait for one or more processes to be completed before entering a user verification state 83.

In user verification state 83, CM unit 24 at mobile device 14 may request verification or authentication from CD system 12 at financial institution 8. This verification operation may include CM unit 24 being validated as a subscriber or member of CD system 12 and associated or linked with one or more credit card accounts at financial institution 8. In this way, the verification operation may be similar to CM unit 24 logging into or binding with CD system 12. CM unit 24 may wait in user verification state 83 until a decision is received from CD system 12 indicating whether CM unit 24 is verified or authenticated. If CM unit 24 is verified by CD system 12, CM unit 24 may enter an engine activation state 84.

In engine activation state 84, CM unit 24 may receive a static identifier from a credit card of one of the credit card accounts linked to CM unit 24 that is used to initiate a payment transaction with merchant 16. In addition, CM unit 24 may receive preemptive information for the payment transaction, such as a handshake time stamp between the credit card and merchant 16. CM unit 24 may then send a request to CD system 12 to activate token generation engine 44 of CM unit 24. CM unit 24 may wait in engine activation state 84 until a decision is received from CD system 12 indicating whether token generation engine 44 is activated. Once token generation engine 44 is activated, CM unit 24 may enter a token generation state 86.

In token generation state 86, token generation engine 44 of CM unit 24 issues a random identifier for the payment transaction initiated by the credit card. CM unit 24 then generates a token for the payment transaction including the static identifier for the credit card, the preemptive information for the payment transaction, and the random identifier for the payment transaction. CM unit 24 then decrements the number of tokens tracked by token counter 46 by one, and shuts down token generation engine 44.

Additionally, in token generation state 86, CM unit 24 may receive a time slot interval for the payment transaction from CD system 12. The time slot interval allocated by CD system 12 is running and awaiting the token for the payment transaction from CM unit 24. In token generation state 86, CM unit 24 may first determine whether the time slot interval from CD system 12 is still alive. If the time slot interval is no longer alive, the payment transaction activation cycle will fail. If a number of denied payment transactions exceeds a risk threshold value associated with the credit card account, CM unit 24 may be locked or deactivated by CD system 12 until a representative of financial institution 8 can investigate and unlock CM unit 24 for future use.

While the time slot interval is alive, CM unit 24 sends the token generated for the payment transaction to CD system 12. CM unit 24 may wait in token generation state 86 until a decision is received from CD system 12 indicating whether the token for the payment transaction is valid, e.g., whether the token is generated within the time slot interval allocated for the payment transaction. If the token is valid, CM unit 24 may enter a transaction activation state 88.

In transaction activation state 88, CM unit 24 requests activation of the payment transaction from CD system 12. Transaction activation unit 22 of CD system 12 uses token comparison unit 70 to compare the preemptive information of the token received from CM unit 24 with actual payment transaction information from merchant 16 to determine whether to activate the payment transaction. CM unit 24 may wait in transaction activation state 88 until a ruling is received from CD system 12 indicating whether the payment transaction is activated. Once transaction activation unit 22 of CD system 12 activates the payment transaction, CD system 12 may send messages to CM unit 24 and merchant 16 indicating that the payment transaction is activated.

Upon receiving the message from CD system 12 indicating that the payment transaction is activated, CM unit 24 may enter shut down state 89. In some examples, CM unit 24 may first perform an audit prior to entering shut down state 89. Once in shut down state 89, CM unit 24 may return to idle state 80.

In some examples, an error or exception may occur at CM unit 24, and a decision request may be sent to CD system 12 at financial institution 8 to determine whether to shut down CM unit 24. CD system 12 may then make a decision regarding the error or exception, and send a ruling back to CM unit 24 indicating whether or CM unit 24 should enter shut down state 89 in view of the error or exception. In some cases, the error or exception may result in CM unit 24 needing to be reprogrammed or reloaded on mobile device 14 via CD system 14 at financial institution 8.

Figure 5:
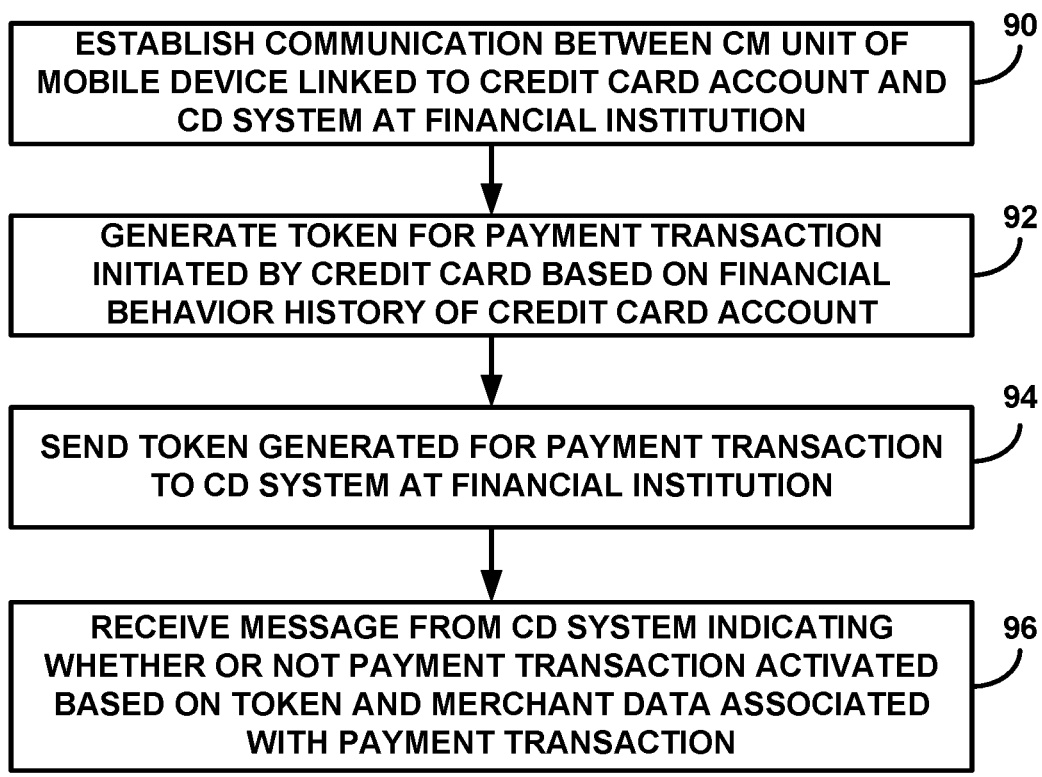
FIG. 5 is a flowchart illustrating an example operation of a campaign manager unit of a mobile device, in accordance with the techniques of this disclosure.

FIG. 5 is a flowchart illustrating an example operation of a campaign manager unit of a mobile device, in accordance with the techniques of this disclosure. The example operation of FIG. 5 is described with respect to CM unit 24 of mobile device 14 from FIGS. 1 and 2.

As described above, CM unit 24 executing on one or more processors of mobile device 14 is linked to one or more credit card accounts at financial institution 8. Each of the linked credit card accounts at financial institution 8 may be accessible via a credit card. In one example, the credit card may comprise a physical smart card, such as smart card 28 from FIG. 1, including a microchip configured to store and communicate information. In another example, the credit card may comprise one of a plurality of virtual credit cards stored in a mobile payment unit of mobile device 14, such as mobile payment unit 26 from FIG. 1.

Prior to initiating a payment transaction using a credit card of a given credit card account that is linked to CM unit 24, mobile device 14 establishes communication between CM unit 24 of mobile device 14 and CD system 12 at financial institution 8 (90). In some examples, establishing communication between CM unit 24 and CD system 12 may include turning on, waking up, or otherwise activating CM unit 24 to execute on mobile device 14 in response to user input. For example, mobile device 14 may activate CM unit 24 in response to sensor input that mobile device 14 is near a point-of-sale device at a merchant, e.g., merchant 16 from FIG. 1. As another example, mobile device 14 may activate CM unit 24 in response to a user opening or selecting to use CM unit 24 via touch screen, keypad, voice control, or other user input interface of mobile device 14. Once activated, CM unit 24 may request verification with CD system 12 at financial institution 8. For example, CM unit 24 may facilitate the entry of a password or other unique information by a user of mobile device 14 in order to authenticate CM unit 24 as a valid participant in a payment transaction campaign with CD system 12 at financial institution 8.

After CM unit 24 has been activated and verified such that communication has been established between CM unit 24 and CD system 12, CM unit 24 generates a token for a payment transaction initiated by the credit card of the given credit card account based on a financial behavior history associated with the credit card account (92). As described above, CM unit 24 executing on mobile device 14 may have been originally distributed and programmed by CD system 12. In addition, CM unit 24 may be periodically (e.g., weekly or monthly) updated by CD system 12. Such maintenance updates may be performed while CM unit 24 is in an inactive or idle state.

According to the techniques of this disclosure, token generation engine 44 and token counter 46 of CM unit 24 may be programmed or updated by CD system 12 to have particular features or values based on the financial behavior history associated with the given credit card account linked to CM unit 24. CM unit 24 may be programmed with a different token generation engine and a different token counter for each of the credit card accounts linked to CM unit 24. For example, token generation engine 44 of CM unit 24 may be programmed or updated to use a particular algorithm to generate tokens for payment transactions and/or to apply a particular level of encryption to the generated tokens based on the financial behavior history associated with the given credit card account. As another example, token counter 46 of CM unit 24 may be programmed or updated with a predetermined number of tokens that may be allocated within a certain time frame, e.g., per day, per week, or per month, based on the financial behavior history associated with the given credit card account.

In one example, in order to generate the token for the payment transaction initiated by the credit card of the given credit card account, CM unit 24 may first receive a static identifier for the credit card account and preemptive information for the payment transaction from the credit card. The static identifier for the credit card account may include the card holder's name, the account number, the expiration date, and the card security code that is printed or embossed on the physical card. The preemptive information for the payment transaction may include one or more of a handshake timestamp between the credit card and the merchant, a monetary amount, a geographic location of the merchant, or a name of the merchant. The information is considered "preemptive" because it is collected at initiation of the payment transaction. CM unit 24 may receive the information from the credit card upon the credit card being swiped by a magnetic tape sensor point-of-sale device at the merchant, waved near a RF proximity sensor point-of-sale device at the merchant, or otherwise provided to the merchant via a wireless network in a "card present" transaction or via the Internet in a "card not present" transaction.

Continuing the above example, upon receiving the static identifier and preemptive information from the credit card, CM unit 24 may use token generation engine 44 to issue a random identifier for the payment transaction. For example, token generation engine 44 may comprise a random number sequencing engine. CM unit 24 may then combine the static identifier, the random identifier, and the preemptive information to generate the token for the payment transaction. After generating the token for the payment transaction, CM unit 24 may use token counter 46 to decrement the predetermined number of tokens that may be allocated within the certain time frame. In other examples, CM unit 24 may perform more, fewer, or different steps to generate the token for the payment transaction.

CM unit 24 then sends the token generated for the payment transaction to CD system 12 at financial institution 8 (94). Along with the token generated for the payment transaction, CM unit 24 may send a request to CD system 12 for a decision of whether the payment transaction is activated. In some examples, CM unit 24 may first receive a time slot interval allocated for the payment transaction from CD system 12 at financial institution 8. While the time slot interval is still active, CM unit 24 may send the token generated for the payment transaction to CD system 12. If the time slot interval expires before CM unit 24 can generate and send the token, CM unit 24 will not send the token and the payment transaction will be denied by CD system 12.

In response to sending the token for the payment transaction, CM unit 24 receives a message from CD system 12 at financial institution 8 indicating whether the payment transaction is activated based on the token and merchant data associated with the payment transaction (96). As described in more detail with respect to FIGS. 1, 3 and 6, CD system 12 at financial system 8 may determine whether to activate the payment transaction based on a comparison of the preemptive information of the token with actual payment transaction information included in the merchant data. In the case that the token matches the merchant data, CM unit 24 receives a transaction activation message from CD system 12 and then shuts down until activated for a subsequent payment transaction.

In the case that the token does not match the merchant data, CM unit 24 receives a transaction denial message from CD system 12. In this case, CM unit 24 may be deactivated and then reloaded or updated on mobile device 14 by CD system 12 before being used for any subsequent payment transactions. If a number of denied payment transactions initiated by the credit card exceeds a risk threshold value, CM unit 24 along with the linked credit card account and CD system 12 may be deactivated until a representative of financial institution 8 can investigate and mitigate the risk.

Figure 6:
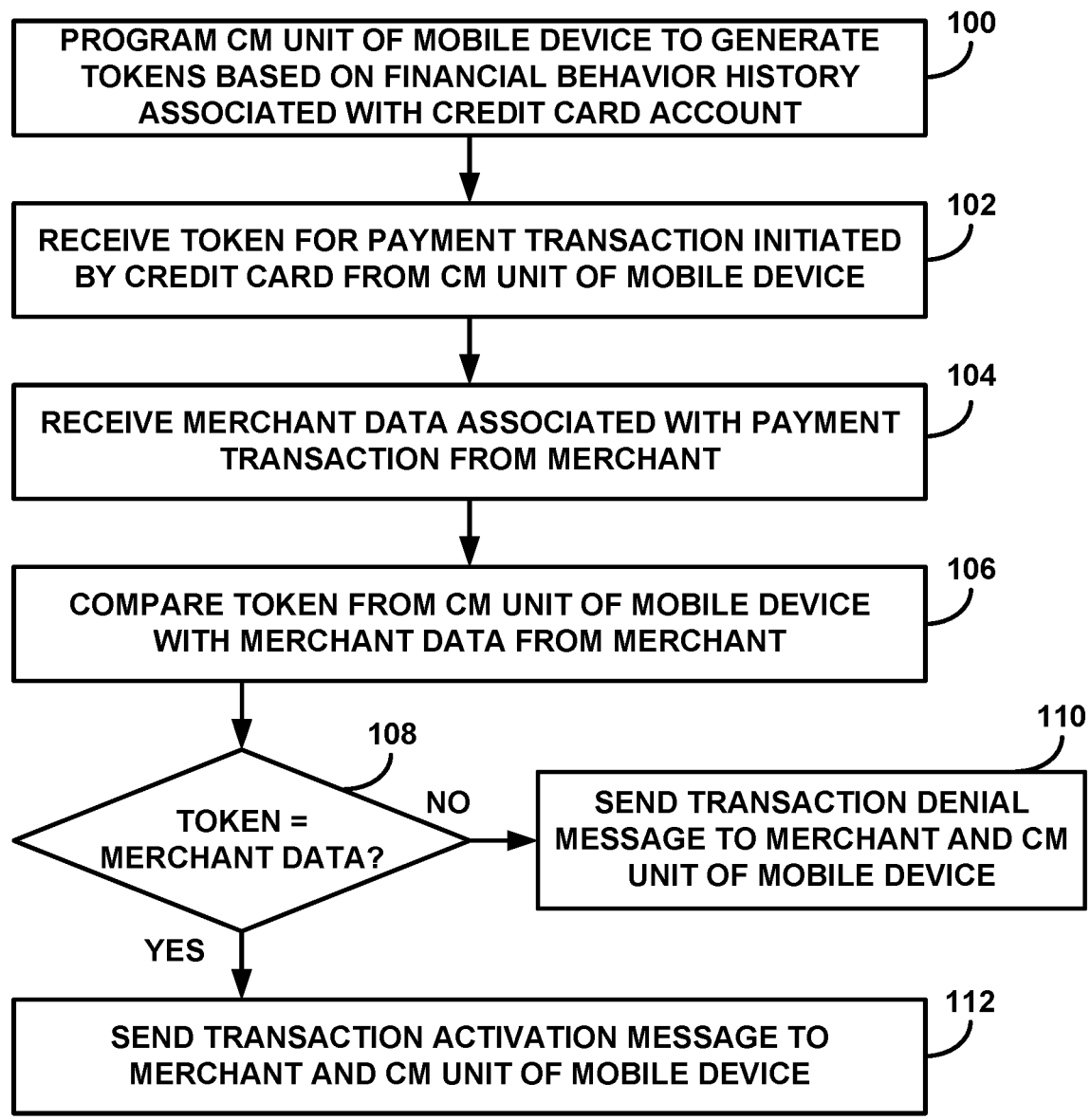
FIG. 6 is a flowchart illustrating an example operation of a campaign director system at a financial institution, in accordance with the techniques of this disclosure.

FIG. 6 is a flowchart illustrating an example operation of a campaign director system at a financial institution, in accordance with the techniques of this disclosure. The campaign direction system may be executed on one or more computing devices physically located at the financial institution, on one or more computing devices located external to the financial institution, on virtual devices within the cloud, or on some combination therefore. In general, a campaign director system at a financial institution may communicate with campaign manager units of multiple different mobile devices that are associated or linked to credit cards accounts at the financial institution that belong to the users of the different mobile devices. For ease of explanation, the example operation of FIG. 6 is described with respect to CD system 12 at financial institution 8, from FIGS. 1 and 3, in communication with CM unit 24 of mobile device 24, from FIGS. 1 and 2.

As described above, CD system 12 at financial institution 8 may be configured to execute token subscription unit 20 and transaction activation unit 22. Token subscription unit 20 of CD system 12 programs CM unit 24 of mobile device 14 to generate tokens for payment transactions based on a financial behavior history associated with a given credit card account at financial institution 8 that belongs to the user of mobile device 14 and is associated or linked to CM unit 24 (100). Token subscription unit 20 of CD system 12 may distribute, program, and periodically (e.g., weekly or monthly) update CM unit 24 executing on mobile device 14. Token subscription unit 20 may access the financial behavior history associated with the given credit card account from financial behavior history database 62 stored at financial institution 8.

According to the techniques of this disclosure, token subscription unit 20 of CD system 12 may program or update token generation engine 44 and token counter 46 of CM unit 24 to have particular features or values based on the financial behavior history associated with the given credit card account linked to CM unit 24. Token subscription unit 20 of CD system 12 may program CM unit 24 with a different token generation engine and a different token counter for each of the credit card accounts linked to CM unit 24. For example, token subscription unit 20 of CD system 12 may program or update token generation engine 44 of CM unit 24 to use a particular algorithm to generate tokens for payment transactions and/or to apply a particular level of encryption to the generated tokens based on the financial behavior history associated with the given credit card account. As another example, token calculation unit 66 of token subscription unit 20 may calculate a number of tokens that may be allocated within a certain time frame, e.g., per day, per week, or per month, based on the financial behavior history associated with the given credit card account, and token subscription unit 20 may program or update token counter 46 of CM unit 24 with the predetermined number of tokens.

Transaction activation unit 22 of CD system 12 receives, from CM unit 24 of mobile device 14, a token generated for a payment transaction initiated by a credit card of the given credit card account with merchant 16 (102). In one example, the token generated for the payment transaction comprises a static identifier for the given credit card account, a random identifier for the payment transaction, and preemptive information for the payment transaction. The random identifier for the payment transaction may comprise a random number issued by token generation engine 44 of CM unit 24. The static identifier for the credit card account may include the card holder's name, the account number, the expiration date, and the card security code that is printed or embossed on the physical card. The preemptive information for the payment transaction may include one or more of a handshake timestamp between the credit card and the merchant, a monetary amount, a geographic location of the merchant, or a name of the merchant. The information is considered "preemptive" because it is collected at initiation of the payment transaction.

Transaction activation unit 22 of CD system 12 also receives, from merchant 16, merchant data associated with the payment transaction (104). In some examples, the merchant data may include actual payment transaction information, such as one or more of a handshake timestamp between the credit card and the merchant, a monetary amount, a geographic location of the merchant, or a name of the merchant. The merchant data may also include the static identifier for the given credit card account.

In some examples, CD system 12 may allocate a time slot interval for the payment transaction, and CD system 12 may send the allocated time slot interval to CM unit 24 along with a decision to activate token generation engine 44 of CM unit 24. If the time slot interval expires before transaction activation unit 22 of CD system 12 receives the token generated for the payment transaction, transaction activation unit 22 of CD system 12 may deny the payment transaction.

If the time slot interval is still active when transaction activation unit 22 of CD system 12 receives the token generated for the payment transaction, transaction activation unit 22 of CD system 12 may store the token in the time slot interval for the payment transaction and start a watchdog timer. In the case that transaction activation unit 22 of CD system 12 does not receive the merchant data prior to expiration of the watchdog timer, transaction activation unit 22 of CD system 12 may deny the payment transaction. In the case that transaction activation unit 22 of CD system 12 receives the merchant data prior to expiration of the watchdog timer, transaction activation unit 22 of CD system 12 may determine whether to activate the payment transaction based on the token and the merchant data.

Token comparison unit 70 of transaction activation unit 22 then compares the token generated for the payment transaction received from CM unit 24 of mobile device 14 and the merchant data associated with the payment transaction received from merchant 16 to determine whether to activate the payment transaction (106). In one example, token comparison unit 70 of transaction activation unit 22 may compare the preemptive information of the token with the actual payment transaction information included in the merchant data to determine whether to activate the payment transaction. In the case that the token matches the merchant data (YES branch of 108), transaction activation unit 22 of CD system 12 sends a transaction activation message to merchant 16 and CM unit 24 of mobile device 14 (112). In this case, CD system 12 may also instruct the CM unit 24 of mobile device 14 to shut down until activated for a subsequent payment transaction.

In the case that the token does not match the merchant data (NO branch of 108), transaction activation unit 22 of CD system 12 sends a transaction denial message to merchant 16 and CM unit 24 of mobile device 14 (110). In this case, transaction activation unit 22 of CD system 12 may determine whether a total number of denied payment transactions initiated by the credit card of the given credit card account exceeds a risk threshold value. In the case that the risk threshold value is exceeded, transaction activation unit 22 of CD system 12 may deactivate at least one of CM unit 24 of mobile device 12, the credit card of the given credit card account, or CD system 12 itself until a representative of financial institution 8 can investigate and mitigate the risk.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A campaign director (CD) system associated with a financial institution, the system comprising:
   one or more processors;
   and a memory storing computer executable instructions that, when executed by the one or more processors, cause the one or more processors to:
      program a token generation engine of a campaign manager (CM) unit executed on one or more processors of a mobile device to generate tokens for payment transactions using at least one of a complexity of algorithm or a level of encryption based on a level of risk indicated by a financial behavior history associated with a credit card account at the financial institution,
      receive, from the token generation engine of the CM unit of the mobile device, a token generated for a payment transaction initiated by a credit card of the credit card account with a merchant in accordance with the least one of the complexity of algorithm or the level of encryption, wherein the token comprises a static identifier for the credit card account, a random identifier generated by the CM unit of the mobile device for the payment transaction, and preemptive information for the payment transaction,
      receive, from the merchant, merchant data associated with the payment transaction,
      compare the preemptive information of the token generated for the payment transaction and actual payment transaction information included in the merchant data associated with the payment transaction,
      determine whether to activate the payment transaction based on the comparison of the token generated for the payment transaction and the merchant data associated with the payment transaction,
      send, to at least one of the CM unit of the mobile device or the merchant, a message indicating whether the payment transaction is activated,
      determine whether to shut down the CM unit based on one of the payment transaction being activated or occurrence of an error or an exception at the CM unit, and
      based on a determination to shut down the CM unit, send, to the CM unit of the mobile device, instructions to shut down the CM unit.

2. The system of claim 1, wherein the instructions cause the one or more processors to periodically update the token generation engine of the CM unit of the mobile device to change the at least one of the complexity of algorithm or the level of encryption used by the token generation engine based on changes to the level of risk indicated by the financial behavior history associated with the credit card account.

3. The system of claim 1, wherein the instructions cause the one or more processors to program the token generation engine of the CM unit of the mobile device with a predetermined number of tokens available for generation by the token generation engine of the CM unit based on the financial behavior history associated with the credit card account.

4. The system of claim 1, wherein the preemptive information of the token generated for the payment transaction includes one or more of a handshake timestamp between the credit card and the merchant, a monetary amount, a geographic location of the merchant, or a name of the merchant.

5. The system of claim 1, wherein the instructions cause the one or more processors to, when the token generated for the payment transaction matches the merchant data associated with the payment transaction, send a transaction activation message to the merchant and the CM unit of the mobile device indicating that the payment transaction is activated.

6. The system of claim 1, wherein the instructions cause the one or more processors to, when the token generated for the payment transaction does not match the merchant data associated with the payment transaction, send a transaction denial message to the merchant and the CM unit of the mobile device indicating that the payment transaction is denied.

7. The system of claim 1, wherein the instructions cause the one or more processors to:
   allocate a time slot interval for the payment transaction;
   upon receipt of the token for the payment transaction within the time slot interval, store the token for the payment transaction and start a watchdog timer;
   in the case that the merchant data is received prior to expiration of the watchdog timer, activate the payment transaction based on the match between the preemptive information of the token and the actual payment transaction information included in the merchant data; and
in the case that the merchant data is received after expiration of the watchdog timer, deny the payment transaction.

8. The system of claim 1, wherein the instructions cause the one or more processors to, when the payment transaction is denied and a number of denied payment transactions initiated by the credit card of the credit card account exceeds a risk threshold value, deactivate at least one of the CM unit of the mobile device, the credit card of the credit card account, or the CD system at the financial institution.

9. A method comprising:
programing, by a campaign director (CD) system associated with a financial institution, a token generation engine of a campaign manager (CM) unit executed on one or more processors of a mobile device to generate tokens for payment transactions using at least one of a complexity of algorithm or a level of encryption based on a level of risk indicated by a financial behavior history associated with a credit card account at the financial institution;
receiving, by the CD system and from the token generation engine of the CM unit of the mobile device, a token generated for a payment transaction initiated by a credit card of the credit card account with a merchant in accordance with the least one of the complexity of algorithm or the level of encryption, wherein the token comprises a static identifier for the credit card account, a random identifier generated by the CM unit of the mobile device for the payment transaction, and preemptive information for the payment transaction;
receiving, by the CD system and from the merchant, merchant data associated with the payment transaction;
comparing, by the CD system, the preemptive information of the token generated for the payment transaction and actual payment transaction information included in the merchant data associated with the payment transaction;
determining, by the CD system, whether to activate the payment transaction based on the comparison of the token generated for the payment transaction and the merchant data associated with the payment transaction;
sending, by the CD system to at least one of the CM unit of the mobile device or the merchant, a message indicating whether the payment transaction is activated;
determining, by the CD system, whether to shut down the CM unit based on one of the payment transaction being activated or occurrence of an error or an exception at the CM unit; and
based on a determination to shut down the CM unit, sending, by the CD system to the CM unit of the mobile device, instructions to shut down the CM unit.

10. The method of claim 9, further comprising periodically updating the token generation engine of the CM unit of the mobile device to change the at least one of the complexity of algorithm or the level of encryption used by the token generation engine based on changes to the level of risk indicated by the financial behavior history associated with the credit card account.

11. The method of claim 9, wherein the preemptive information of the token generated for the payment transaction includes one or more of a handshake timestamp between the credit card and the merchant, a monetary amount, a geographic location of the merchant, or a name of the merchant.

12. The method of claim 11, wherein sending the message comprises, when the token generated for the payment transaction matches the merchant data associated with the payment transaction, sending a transaction activation message to the merchant and the CM unit of the mobile device indicating that the payment transaction is activated.

13. The method of claim 11, wherein sending the message comprises, when the token generated for the payment transaction does not match the merchant data associated with the payment transaction, sending a transaction denial message to the merchant and the CM unit of the mobile device indicating that the payment transaction is denied.

14. The method of claim 11, further comprising:
allocating a time slot interval for the payment transaction;
upon receipt of the token for the payment transaction within the time slot interval, storing the token for the payment transaction and starting a watchdog timer;
in the case that the merchant data is received prior to expiration of the watchdog timer, activating the payment transaction based on the match between the preemptive information of the token and the actual payment transaction information included in the merchant data; and
in the case that the merchant data is received after expiration of the watchdog timer, denying the payment transaction.

15. The method of claim 11, further comprising, when the payment transaction is denied and a number of denied payment transactions initiated by the credit card of the credit card account exceeds a risk threshold value, deactivating at least one of the CM unit of the mobile device, the credit card of the credit card account, or the CD system at the financial institution.

16. A non-transitory computer readable medium storing instructions that, when executed, cause one or more processors of a campaign director (CD) system associated with a financial institution to:
program a token generation engine of a campaign manager (CM) unit executed on one or more processors of a mobile device to generate tokens for payment transactions using at least one of a complexity of algorithm or a level of encryption based on a level of risk indicated by a financial behavior history associated with a credit card account at the financial institution;
receive, from the token generation engine of the CM unit of the mobile device, a token generated for a payment transaction initiated by a credit card of the credit card account with a merchant in accordance with the least one of the complexity of algorithm or the level of encryption, wherein the token comprises a static identifier for the credit card account, a random identifier generated by the CM unit of the mobile device for the payment transaction, and preemptive information for the payment transaction;
receive, from the merchant, merchant data associated with the payment transaction; compare the preemptive information of the token generated for the payment transaction and actual payment transaction information included in the merchant data associated with the payment transaction;
determine whether to activate the payment transaction based on the comparison of the token generated for the payment transaction and the merchant data associated with the payment transaction;
send, to at least one of the CM unit of the mobile device or the merchant, a message indicating whether the payment transaction is activated;

determine whether to shut down the CM unit based on one of the payment transaction being activated or occurrence of an error or an exception at the CM unit; and based on a determination to shut down the CM unit, send, to the CM unit of the mobile device, instructions to shut down the CM unit.

17. The system of claim 1, wherein to program the token generation engine of the CM unit of the mobile device, the instructions cause the one or more processors to program the token generation engine to generate tokens for payment transaction using at least one of a high-complexity algorithm or a high level of encryption based on the financial behavior history indicating high risk behavior.

18. The system of claim 1, wherein to program the token generation engine of the CM unit of the mobile device, the instructions cause the one or more processors to program the token generation engine to generate tokens for payment transaction using at least one of a low-complexity algorithm or a low level of encryption based on the financial behavior history indicating low risk behavior.

19. The system of claim 2, wherein to periodically update the token generation engine of the CM unit of the mobile device, the instructions cause the one or more processors to change the at least one of the complexity of algorithm from a low-complexity algorithm to a high-complexity algorithm or the level of encryption from a low level of encryption to a high level of encryption based on changes to the financial behavior history from indicating low risk behavior to indicating high risk behavior.

\* \* \* \* \*